US011833728B2

(12) United States Patent
Sieradzki (10) Patent No.: US 11,833,728 B2
(45) Date of Patent: Dec. 5, 2023

(54) HIGH PRESSURE PROCESS OF FORMING AND FILLING A CONTAINER

(71) Applicant: Discma AG, Hünenberg (CH)

(72) Inventor: Richard Sieradzki, Novi, MI (US)

(73) Assignee: DISCMA AG, Hünenberg (CH)

( * ) Notice: Subject to any disclaimer, the term of this patent is extended or adjusted under 35 U.S.C. 154(b) by 86 days.

(21) Appl. No.: 17/596,689

(22) PCT Filed: Jun. 22, 2020

(86) PCT No.: PCT/IB2020/055883
§ 371 (c)(1),
(2) Date: Dec. 16, 2021

(87) PCT Pub. No.: WO2020/261096
PCT Pub. Date: Dec. 30, 2020

(65) Prior Publication Data
US 2022/0339845 A1 Oct. 27, 2022

Related U.S. Application Data

(60) Provisional application No. 62/867,546, filed on Jun. 27, 2019.

(51) Int. Cl.
*B29C 49/46* (2006.01)
*B29C 49/42* (2006.01)
(Continued)

(52) U.S. Cl.
CPC .............. *B29C 49/46* (2013.01); *B29C 49/06* (2013.01); *B29C 49/1212* (2022.05);
(Continued)

(58) Field of Classification Search
CPC .............. B29C 49/46; B29C 49/42403; B29C 2049/7832; B29C 49/42418;
(Continued)

(56) References Cited

U.S. PATENT DOCUMENTS 4,935,190 A * 6/1990 Tennerstedt ............ B29C 49/00
264/529
2009/0218733 A1 9/2009 Andison et al.
(Continued)

FOREIGN PATENT DOCUMENTS

DE 102011106652 A1 1/2013
DE 102014019400 A1 6/2016
WO WO-2011110149 A2 * 9/2011 ............. B29C 49/36

OTHER PUBLICATIONS

Mechanical translation of Klatt (WO 2011/110149 A2) dated Sep. 2011. (Year: 2011).*
Mechanical translation of Litzenberg et al (DE 10 2014 019 400 A1) dated Jun. 2016. (Year: 2016).*

*Primary Examiner* — Robert B Davis
(74) *Attorney, Agent, or Firm* — Michael E. Dockins; Shumaker, Loop & Kendrick LLP (57) ABSTRACT

Ways for simultaneously forming and filling a container are provided. A hydraulic intensifier (60) receives a first liquid (18) and dispenses the first liquid (18) at a first pressure, where a moveable member (62) having a first surface (64) contacts the first liquid (18) and a second surface (66) contacts a second liquid (68). The second liquid (68) provides a second pressure on the second surface (66) so that the first pressure is applied to the first liquid (18) by the first surface (64). The first surface (64) has a smaller area than the second surface (66) and the first pressure is greater than the second pressure. A blow nozzle (22) transfers the first liquid (18) at the first pressure into a preform (12) within a mold cavity (16) to urge the preform (12) to expand toward an internal surface (34) of the mold cavity (16) and form a resultant container. The first liquid (18) remains within the container as an end product.

23 Claims, 8 Drawing Sheets

(51) Int. Cl.
  *B29C 49/12* (2006.01)
  *B29C 49/06* (2006.01)
  *B29C 49/58* (2006.01)
  *B29C 49/62* (2006.01)
  *B29C 49/78* (2006.01)
  *B29C 49/02* (2006.01)

(52) U.S. Cl.
  CPC .... *B29C 49/4289* (2013.01); *B29C 49/42403* (2022.05); *B29C 49/58* (2013.01); *B29C 49/62* (2013.01); *B29C 49/783* (2013.01); *B29C 2049/024* (2013.01); *B29C 2049/4635* (2013.01); *B29C 2049/4652* (2013.01); *B29C 2049/4664* (2013.01)

(58) Field of Classification Search
  CPC .... B29C 2049/4635; B29C 2049/4652; B29C 2049/4664; B29C 49/42405
  See application file for complete search history.

(56) References Cited

U.S. PATENT DOCUMENTS

| | | | |
|---|---|---|---|
| 2012/0315348 A1* | 12/2012 | Wilson | B65B 3/022 425/149 |
| 2016/0043747 A1 | 2/2016 | Littlejohn et al. | |
| 2016/0082644 A1 | 3/2016 | Chauvin et al. | |
| 2016/0375625 A1* | 12/2016 | Knapp | B29C 49/36 264/37.16 |

\* cited by examiner

HIGH PRESSURE PROCESS OF FORMING AND FILLING A CONTAINER

CROSS-REFERENCE TO RELATED APPLICATIONS

This application claims the benefit of U.S. Provisional Application No. 62/867,546, filed on Jun. 27, 2019. The entire disclosure of the above application is incorporated herein by reference.

FIELD

The present technology relates to simultaneously forming and filling a container using liquid, including use of a hydraulic intensifier to rapidly and aseptically provide a filled container.

INTRODUCTION

This section provides background information related to the present disclosure which is not necessarily prior art.

Various products are distributed in plastic containers, such as containers formed from one or more polymers. Common polymers used to form containers include polyesters, such as polyethylene terephthalate (PET), high and low density polyethylenes, polycarbonate, and polypropylene, among others. Plastic containers can be made using various blow molding processes including injection blow molding and extrusion blow molding.

Injection blow molding can be used to form certain plastic containers in one or more stages and can involve use of a stretch rod. In a two-stage injection stretch blow molding process, the plastic is first molded into a preform using an injection molding process. The preform can include the neck and finish of the container to be formed, which can include threading thereon, and a closed distal end. The preform can then be heated above the plastic glass transition temperature, longitudinally stretched with a stretch rod, and blown using high-pressure gas (e.g., air) into a container conforming to a mold. As the preform is inflated, it elongates and stretches, taking on the shape of the mold cavity. The plastic solidifies upon contacting the cooler surface of the mold and the finished hollow container is subsequently ejected from the mold. The injection stretch blow molding process can be used to form plastic containers for packaging consumer beverages, as well as other liquids and materials. However, the process has some inherent limitations, which include undesirable gate wells or discontinuities on the bottom portions of containers, as well as limitations on the possible spectrum of designs that can be realized using the stretch blow molding process, such as containers incorporating a handle or void space therein.

Extrusion blow molding can be used to form certain plastic containers where a continuously extruded hot plastic tube or parison is captured within a mold and inflated against the inner surfaces of the mold to form a container blank. The mold can be designed to travel at the speed at which the extruded parison is moving when it closes on the parison so that the process can operate on a continuous basis. There are several different types of extrusion blow molding machines, including shuttle molds that are designed to travel in a linear motion and extrusion blow molding wheels that travel in a rotary or circular motion. While extrusion blow molding processes have addressed a need for an improved plastic container that obviates some of the disadvantages inherent to containers fabricated using the stretch blow molding process, the extrusion blow molding processing requires a number of steps to form the container then later fill and cap the container. As a result, significant costs can be incurred while separately performing the container forming and filling processes, including transport and time commitments.

Blow molding containers and subsequent filling of containers have consequently developed as two independent processes, in many instances occurring at different facilities. In order to make container filling more cost effective, some filling facilities have installed blow molding equipment on site, in certain cases integrating blow molders directly into filling lines. Equipment manufacturers have recognized this advantage and are selling "integrated" systems that are designed to insure that the blow molder and the filler are fully synchronized. Despite the efforts in bringing the two processes together, blow molding and filling continue to be two independent, distinct processes. As a result, significant costs may be incurred in separately performing these two processes. There is also a concern in aseptically filling containers where transport, handling, and/or time between preparing the container and filling the container can result in additional opportunities for introducing contamination into the system. For example, such integrated systems can require maintaining the subject liquid in a clean or sterile state prior to filling the container and/or require introduction of a sterilizing step and associated equipment prior to filling the container.

Thus, there is a need for a liquid or hydraulic blow molding system suitable for forming and filling a container in a single operation to optimize packaging of a liquid product by minimizing transport and time demands, that can provide aseptic filling of the container, and that can improve the resulting container appearance and performance.

SUMMARY

The present technology includes articles of manufacture, systems, and processes that relate to use of a liquid to fill and form a container under certain pressure conditions, where the liquid remains in the container thereby merging formerly separate processes and enabling aseptic liquid packaging and transfer of fine mold details to the resulting filled container.

Systems for simultaneously forming and filling a container include a mold cavity, a hydraulic intensifier, and a blow nozzle. The mold cavity defines an internal surface and is configured to accept a preform. The hydraulic intensifier is configured to receive a first liquid and dispense the first liquid at a first pressure, where the hydraulic intensifier includes a moveable member having a first surface contacting the first liquid and a second surface contacting a second liquid. The second liquid is configured to provide a second pressure on the second surface so that the first pressure is applied to the first liquid by the first surface. The first surface has a smaller area than the second surface and the first pressure is greater than the second pressure. The blow nozzle is configured to transfer the first liquid at the first pressure into the preform to urge the preform to expand toward the internal surface of the mold cavity and form a resultant container, where the first liquid remains within the container as an end product.

Aspects of such systems can further include a pressure source providing the first liquid to the hydraulic intensifier and to the blow nozzle. The pressure source can be configured to provide the first liquid to the hydraulic intensifier and to the blow nozzle at a third pressure, the third pressure being less than the first pressure. Embodiments of the pressure source can have an inlet, a chamber, an outlet, and a mechanically driven piston-like device moveable within the chamber in a first direction to draw a liquid into the chamber through the inlet and moveable in a second direction to urge the liquid out of the chamber through the outlet as the first liquid. The piston-like device can be one of a piston, a pump, and an accumulator. Systems can include a stretch rod configured to mechanically stretch the preform within the mold cavity prior to the first liquid at the first pressure being transferred into the preform by the blow nozzle, where the stretch rod can be vented. In some embodiments, the first pressure at which the first liquid is dispensed from the hydraulic intensifier can be greater than about 50,000 psi, in other embodiments can be from about 50,000 psi to about 200,000 psi, and in further embodiments can be from about 125,000 psi to about 175,000 psi. Certain embodiments of the hydraulic intensifier can use a ratio of a first area of the first surface to a second area of the second surface that is greater than about 1:10 and other embodiments can use a ratio of a first area of the first surface to a second area of the second surface that is from about 1:10 to about 1:20.

Methods of simultaneously forming and filling a container include applying a first pressure to a first liquid using a hydraulic intensifier. The hydraulic intensifier includes a moveable member having a first surface contacting the first liquid and a second surface contacting a second liquid. The second liquid is configured to provide a second pressure on the second surface so that the first pressure is applied to the first liquid by the first surface, where the first surface has a smaller area than the second surface resulting in the first pressure being greater than the second pressure. The first liquid at the first pressure is dispensed from the hydraulic intensifier to a blow nozzle, where the blow nozzle is configured to transfer the first liquid at the first pressure into a preform within a mold cavity. The mold cavity defines an internal surface where the preform is expanded toward the internal surface of the mold cavity using the first liquid to form a resultant container. The first liquid remains thereafter within the container as an end product.

Aspects of such methods can further include where, prior to applying the first pressure to the first liquid using the hydraulic intensifier, the first liquid is provided to the hydraulic intensifier and the blow nozzle using a pressure source. The pressure source can provide the first liquid to the hydraulic intensifier and to the blow nozzle at a third pressure, the third pressure being less than the first pressure. Providing the first liquid to the hydraulic intensifier and to the blow nozzle using the pressure source can further include where the blow nozzle transfers a portion of the first liquid into the preform to partially expand the preform toward the internal surface of the mold cavity. Embodiments of the pressure source can have an inlet, a chamber, an outlet, and a mechanically driven piston-like device moveable within the chamber in a first direction to draw a liquid into the chamber through the inlet and moveable in a second direction to urge the liquid out of the chamber through the outlet as the first liquid. Prior to dispensing the first liquid at the first pressure from the hydraulic intensifier to the blow nozzle, a stretch rod can be used to mechanically stretch the preform within the mold cavity. Expanding the preform toward the internal surface of the mold cavity using the first liquid to form a resultant container can also include venting the preform through the stretch rod.

Methods of simultaneously forming and filling a container are also provided that include mechanically stretching a preform using a stretch rod to form a stretched preform. A first liquid is provided to a hydraulic intensifier and to a blow nozzle using a pressure source and a portion of the first liquid is transferred from the blow nozzle into the stretched preform to partially expand the stretched preform toward an internal surface of a mold cavity to form a partially expanded preform. A first pressure is applied to the first liquid using the hydraulic intensifier, where the hydraulic intensifier includes a moveable member having a first surface contacting the first liquid and a second surface contacting a second liquid. The second liquid is configured to provide a second pressure on the second surface so that the first pressure is applied to the first liquid by the first surface. The first surface has a smaller area than the second surface and the first pressure is greater than the second pressure. The first liquid is dispensed at the first pressure from the hydraulic intensifier to the blow nozzle, where the blow nozzle transfers the first liquid at the first pressure into the partially expanded preform within the mold cavity. The partially expanded preform is expanded toward the internal surface of the mold cavity using the first liquid to form a resultant container, where the first liquid remains within the container as an end product.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

All documents, including patents, patent applications, and scientific literature cited in this detailed description are incorporated herein by reference, unless otherwise expressly indicated. Where any conflict or ambiguity can exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that can be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

The present technology allows for simultaneously forming and filling a container using liquid pressurized by a hydraulic intensifier to rapidly and aseptically provide a liquid-filled container. Apparatus, systems, and methods provided herein make use of a mold cavity that defines an internal surface and that is configured to accept a preform. A hydraulic intensifier operates to receive a first liquid and dispense the first liquid at a first pressure, where the hydraulic intensifier includes a moveable member having a first surface contacting the first liquid and a second surface contacting a second liquid. The second liquid provides a second pressure on the second surface so that the first pressure is applied to the first liquid by the first surface. The first surface has a smaller area than the second surface and the first pressure is greater than the second pressure. A blow nozzle operates to transfer the first liquid at the first pressure into the preform to urge the preform to expand toward the internal surface of the mold cavity and form a resultant container, where the first liquid remains within the container as an end product. The hydraulic intensifier can output the first liquid at a pressure that results in sterilization of the first liquid. Sterilization of a liquid in this manner can be referred to as sterilization by Pascalization or high pressure processing. The pressure provided to urge the preform to expand or to further expand toward the internal surface of the mold cavity and form the resultant container can improve transfer of mold details, including fine texture, that maximizes distinctness of image and can provide crispness and detail permitting fonts as small as four typography points.

With reference to the several figures, an embodiment of a system according to the present technology is shown and generally referred to as reference numeral 10. FIGS. 1-8 show an embodiment of a sequence for simultaneously forming and filling a container C using the system 10 in accordance with the present technology. As will be appreciated from the following description, the system 10 and associated method utilize a first liquid 18 to impart the pressure required to expand or further expand a preform 12 to take on the shape of a mold cavity 16, thus simultaneously forming and filling a resultant container C with the first liquid 18.

With initial reference to FIGS. 1-2, the system 10 will be described in greater detail. The system 10 generally includes a mold 14 having a mold cavity 16, a pressure source 20, a hydraulic intensifier 60, a blow nozzle 22, and a stretch rod 26. The exemplary mold cavity 16 illustrated in the figures includes two mold halves 30, 32 that cooperate to define an interior surface 34 corresponding to a desired outer profile of the resultant container C. The mold cavity 16 can be moveable from an open position (FIG. 1) to a closed position (FIG. 2) such that a support ring 38 of the preform 12 can be captured at an upper end of the mold cavity 16. The preform 12 can be formed of a polyester material, such as polyethylene terephthalate (PET), can have a shape similar to a test-tube with a generally cylindrical cross section, and can have a length approximately fifty percent (50%) of a height of the resultant container C. The support ring 38 can be used to carry or orient the preform 12 through and at various stages of manufacture. For example, the preform 12 can be carried by the support ring 38, the support ring 38 can be used to aid in positioning the preform 12 in the mold cavity 16, and an end consumer can use the support ring 38 to carry the plastic container C once manufactured.

In the example shown, the pressure source 20 can be in the form of a filling cylinder, manifold, or chamber 42 that generally includes a mechanical piston-like device 40 that can be configured in various embodiments as a piston, a pump (e.g., a hydraulic pump), or any other such similarly suitable device, where the piston-like device 40 is moveable within the filling cylinder, manifold, or chamber 42. The pressure source 20 can have an inlet 46 for accepting the first liquid 18 and an outlet 48 for delivering the first liquid 18 to the hydraulic intensifier 60. It is appreciated that the inlet 46 and the outlet 48 can have respective valves 52, 54 incorporated thereat. The piston-like device 40 can be moveable in a first direction (e.g., upward as viewed in the figures) to draw the first liquid 18 from the inlet 46 into the filling cylinder, manifold, or chamber 42, and in a second direction (e.g., downward as viewed in the figures) to deliver the first liquid 18 from the filling cylinder, manifold, or chamber 42 to the hydraulic intensifier 60 and to the blow nozzle 22. The piston-like device 40 can be moveable by any suitable means, such as pneumatically, mechanically, electromagnetically, and/or hydraulically, for example. The inlet 46 of the pressure source 20 can be connected, such as by tubing or piping, to a reservoir or container (not shown) that contains the first liquid 18.

It is understood that the pressure source 20 can be configured differently in various embodiments and that the system 10 can be configured with other means than the pressure source 20 as shown to provide the first liquid 18 to the hydraulic intensifier 60. For example, in certain embodiments the hydraulic intensifier 60 can directly draw the first liquid 18 from a reservoir or container. The pressure source 20 can also be configured as a reservoir or container of pressurized liquid that can provide the first liquid 18 to the remainder of the system 10 by actuation of valve 54, for example.

The hydraulic intensifier 60 can be configured to receive the first liquid 18 and dispense the first liquid 18 at a first pressure. Receipt of the first liquid 18 can coincide with opening valve 54 at the outlet 48 of the pressure source and having valve 78 open. The hydraulic intensifier 60 can include a moveable member 62 having a first surface 64 that can contact the first liquid 18 and a second surface 66 that can contact a second liquid 68. As shown, for example, the moveable member 62 can be configured as a stepped piston where a smaller first piston head 70 provides the first surface 64 and a larger second piston head 72 provides the second surface 66, where the first piston head 70 has a smaller diameter than the second piston head 72. The second liquid 68 can be introduced into the hydraulic intensifier 60 to provide a second pressure on the second surface 66 so that the first pressure is applied to the first liquid 18 by the first surface 64. The first surface 64 has a smaller area than the second surface 66 that results in the first pressure being greater than the second pressure. For example, a ratio of a first area of the first surface 64 to a second area of the second surface 66 can be greater than about 1:10 and can be at or between about 1:10 to about 1:20, in various embodiments. Accordingly, the second pressure provided by the second liquid 68 is intensified by the moveable member to provide the first pressure to the first liquid 18. The hydraulic intensifier 60 can therefore be configured to receive the first liquid 18 and dispense the first liquid 18 at a first pressure that is greater than about 50,000 psi. Embodiments further include where the first pressure is from about 50,000 psi to about 200,000 psi and where the first pressure is from about 125,000 psi to about 175,000 psi. In this way, the hydraulic intensifier 60 can output the first liquid 18 at a pressure that results in sterilization of the first liquid 18 by Pascalization or high pressure processing.

The blow nozzle 22 generally defines an inlet 50 for accepting the first liquid 18 from the hydraulic intensifier 60 and an outlet 56 for delivering the first liquid 18 into the preform 12. Receipt of the first liquid 18 can coincide with opening valve 54 at the outlet 48 of the pressure source. A valve 76 can be positioned within the blow nozzle 22 to control delivery of the first liquid 18 into the preform 12, where valve 76 is open when the blow nozzle 22 transfers a portion of the first liquid 18 into the preform 12 to partially expand the preform 12 toward the internal surface 34 of the mold cavity 16. It is appreciated that the outlet 56 can define a shape complementary to the preform 12 near the support ring 38 such that the blow nozzle 22 can be coupled or easily engage or mate with the preform 12 during the forming/filling process. In certain embodiments, the blow nozzle 22 can define an opening 58 for slidably accepting the stretch rod 26 used to initiate mechanical stretching of the preform 12.

The first liquid 18 can be introduced into the plastic container C during a thermal process, typically a hot-fill process. For hot-fill bottling applications, the plastic container C can be filled with a liquid or product at an elevated temperature between approximately 185° F. to 205° F. (approximately 85° C. to 96° C.) and sealed with a closure (not illustrated) before cooling. In various configurations, the first liquid 18 can be heated within, en route to, and/or after leaving the pressure source 20. The first liquid 18 can also be heated within, en route to, and/or after leaving the hydraulic intensifier 60. It is further possible to heat the first liquid 18 relative to the pressure source 20 by circulating the first liquid 18 within the filling cylinder, manifold, or chamber 42 through the inlet 46 whereby the first liquid 18 can be heated to a preset temperature; e.g., using a heat source (not illustrated) upstream of the inlet 46. In addition, the plastic container C can be suitable for other high-temperature pasteurization or retort filling processes, as well as other thermal processes. In another example, the first liquid 18 can be introduced into the plastic container C under ambient or cold temperatures. Accordingly, by way of example, the plastic container C can be filled at ambient or cold temperatures such as between approximately 32° F. to 90° F. (approximately 0° C. to 32° C.), and more preferably at approximately 40° F. (approximately 4.4° C.). In examples where the liquid commodity is filled at ambient or cold temperatures, the preform can be subjected to a sterilization process before introducing the first liquid 18.

With reference to the several figures, an exemplary method of simultaneously forming and filling the plastic container C will be described. In certain embodiments, the preform 12 can be sterilized by steam or other means prior to being introduced into the mold cavity 16. By subjecting the preform 12 to a sterilizing technique (e.g., steam and/or heat), an aseptic preform and resulting container can be created as the first liquid 18 can be sterilized by the first pressure generated by the hydraulic intensifier 60. The container C therefore need not be formed by a hot-filling process. Other examples of sterilizing the preform 12 include contact with one or more various sterilizing mediums, such as liquid peroxide. The preform 12 can also be passed through an oven in excess of 212° F. (100° C.) and nearly immediately subjected to forming and filling and the resultant filled container C can then be capped. In this way, the opportunity for an empty container to be exposed to the environment where it might become contaminated is minimized and the cost and complexity of aseptic filling can be reduced.

Figure 1:
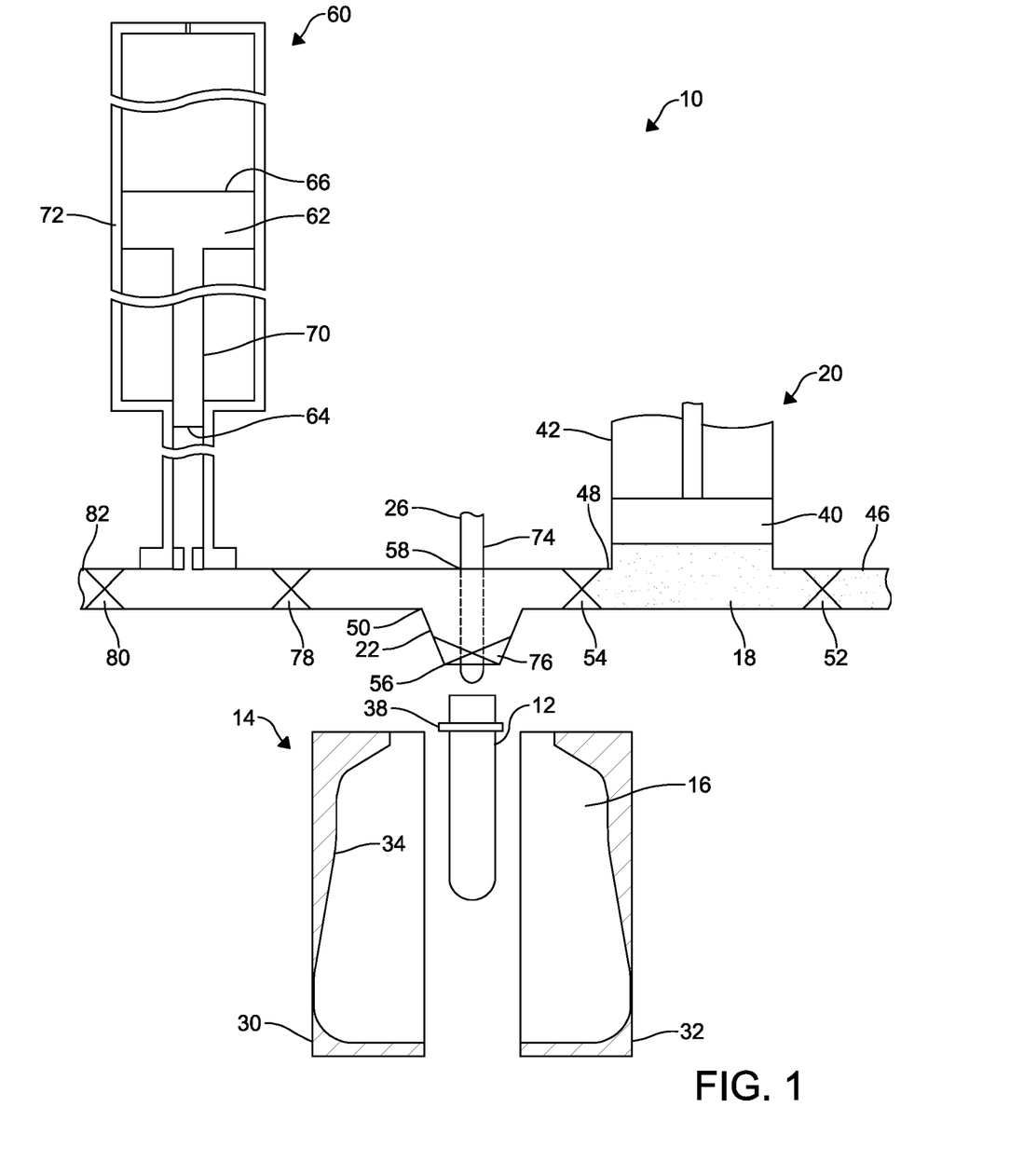
FIG. 1 is a schematic depiction of a system for simultaneously forming and filling a container in accordance with the present technology, where a heated preform is passed into a mold station and a pressure source including a piston-like device begins to move upward, drawing a first liquid into the pressure source.
Figure 2:
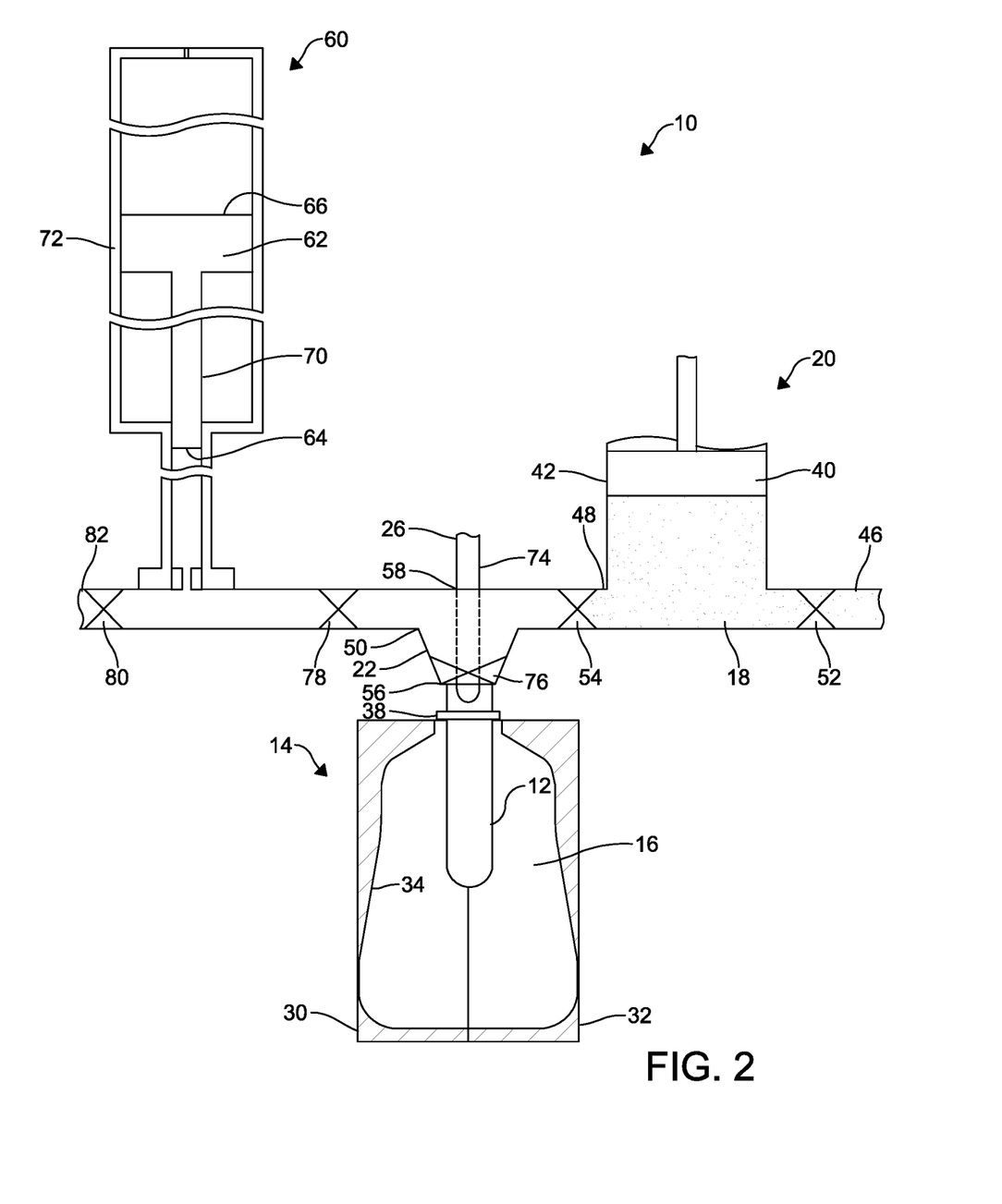
FIG. 2 is a schematic depiction of the system illustrated in FIG. 1, where the mold halves close around the preform and the first liquid continues to accumulate in the pressure source.

The preform 12 can be placed into the mold cavity 16; see FIGS. 1-2. For example, a machine (not illustrated) can transfer the preform 12, heated to a temperature between approximately 190° F. to 250° F. (approximately 88° C. to 121° C.), to the mold 14 where the preform 12 is enclosed within the mold cavity 16. As the preform 12 is placed into the mold cavity 16, the piston-like device 40 of the pressure source 20 can begin to draw the first liquid 18 into the filling cylinder, manifold, or chamber 42 through the inlet 46 while valve 52 is open and valve 54 is closed. The mold halves 30, 32 of the mold cavity 16 can then close thereby capturing the preform 12; see FIG. 2. The blow nozzle 22 can form a seal at a finish of the preform 12. The mold cavity 16 can be heated to a temperature between approximately 250° F. to 350° F. (approximately 93° C. to 177° C.) in order to impart increased crystallinity levels within the resultant container C. In other embodiments, the mold cavity 16 can be provided at ambient or cold temperatures, between approximately 32° F. to 90° F. (approximately 0° C. to 32° C.). The first liquid 18 can continue to be drawn into the filling cylinder, manifold, or chamber 42 by the piston-like device 40.

Figure 3:
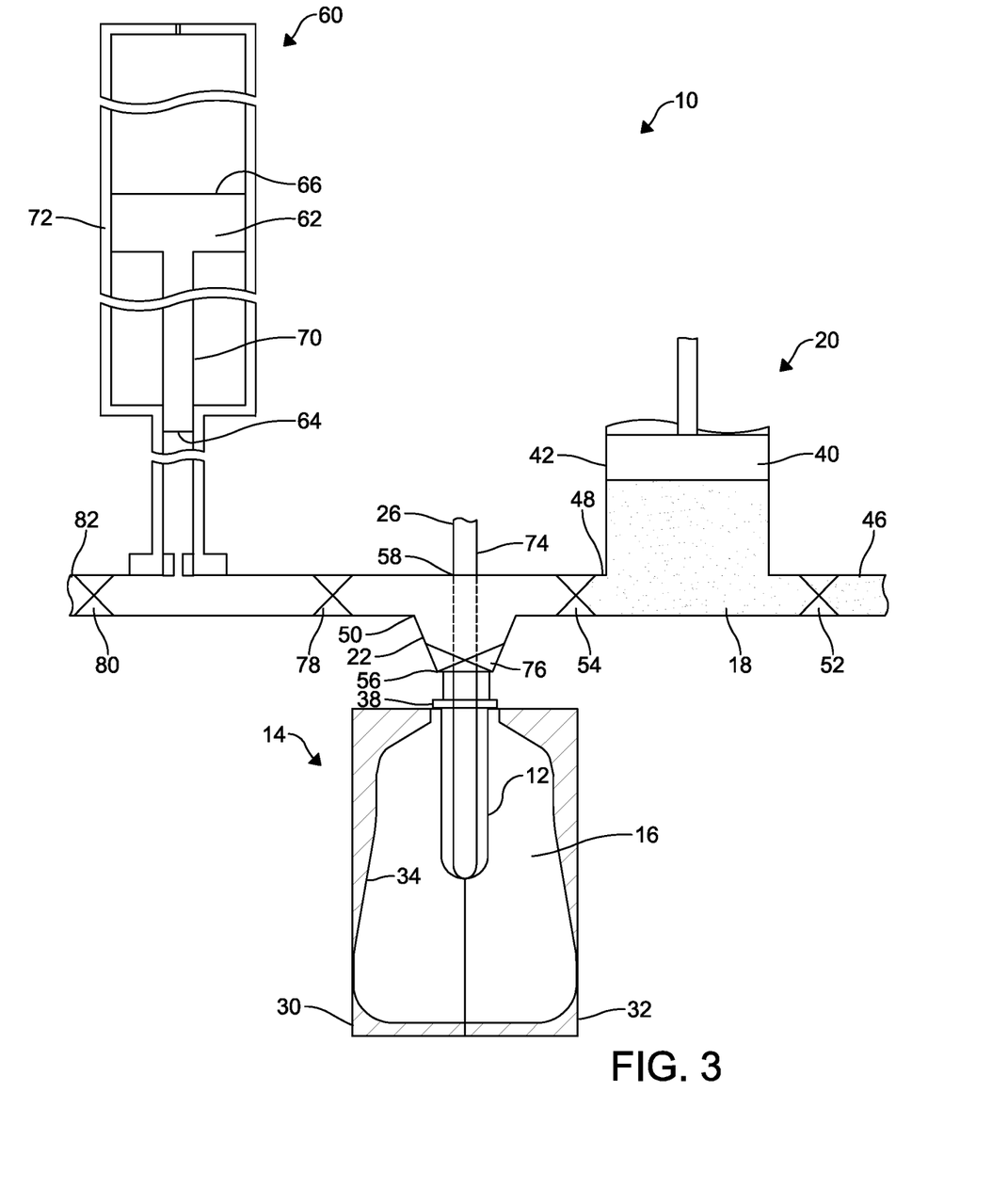
FIG. 3 is a schematic depiction of the system illustrated in FIG. 2, where a stretch rod extends into the preform to initiate mechanical stretching thereof and where the first liquid continues to accumulate in the pressure source.
Figure 4:
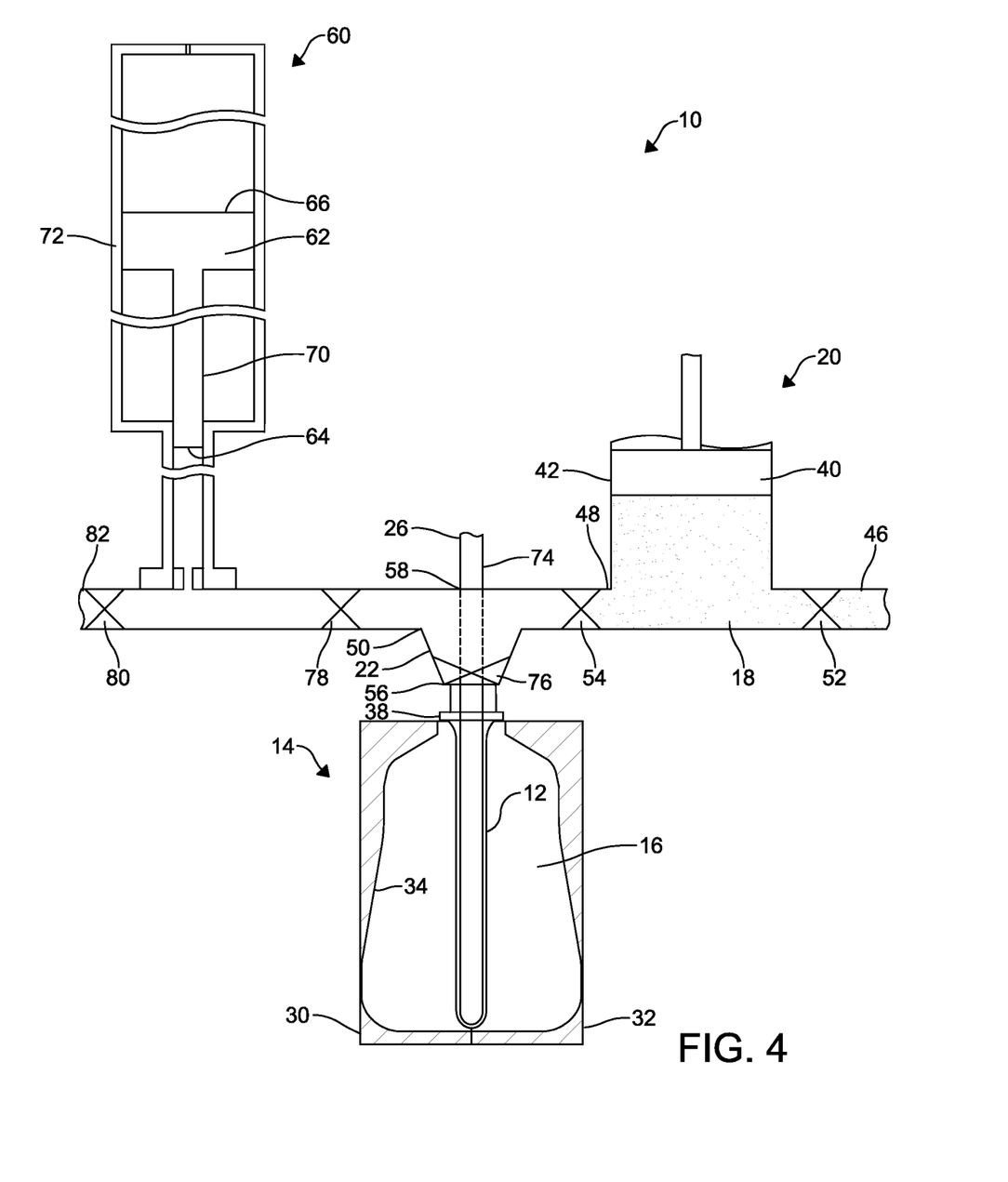
FIG. 4 is a schematic depiction of the system of FIG. 3, where the stretch rod has fully stretched the preform and where a charge of the first liquid has fully accumulated in the pressure source.

Turning now to FIG. 3, the stretch rod 26 can extend into the preform 12 to initiate mechanical stretching. At this point, the first liquid 18 can continue to be drawn into the filling cylinder, manifold, or chamber 42. With reference to FIG. 4, the stretch rod 26 continues to stretch the preform 12 thereby thinning the sidewalls of the preform 12 and forming a stretched preform 12. The volume of the first liquid 18 within the filling cylinder, manifold, or chamber 42 can increase until a desired charge or appropriate volume suitable to form and fill the resultant container C is reached. At this point, the valve 52 disposed at the inlet 46 of the pressure source 20 can be closed.

Figure 5:
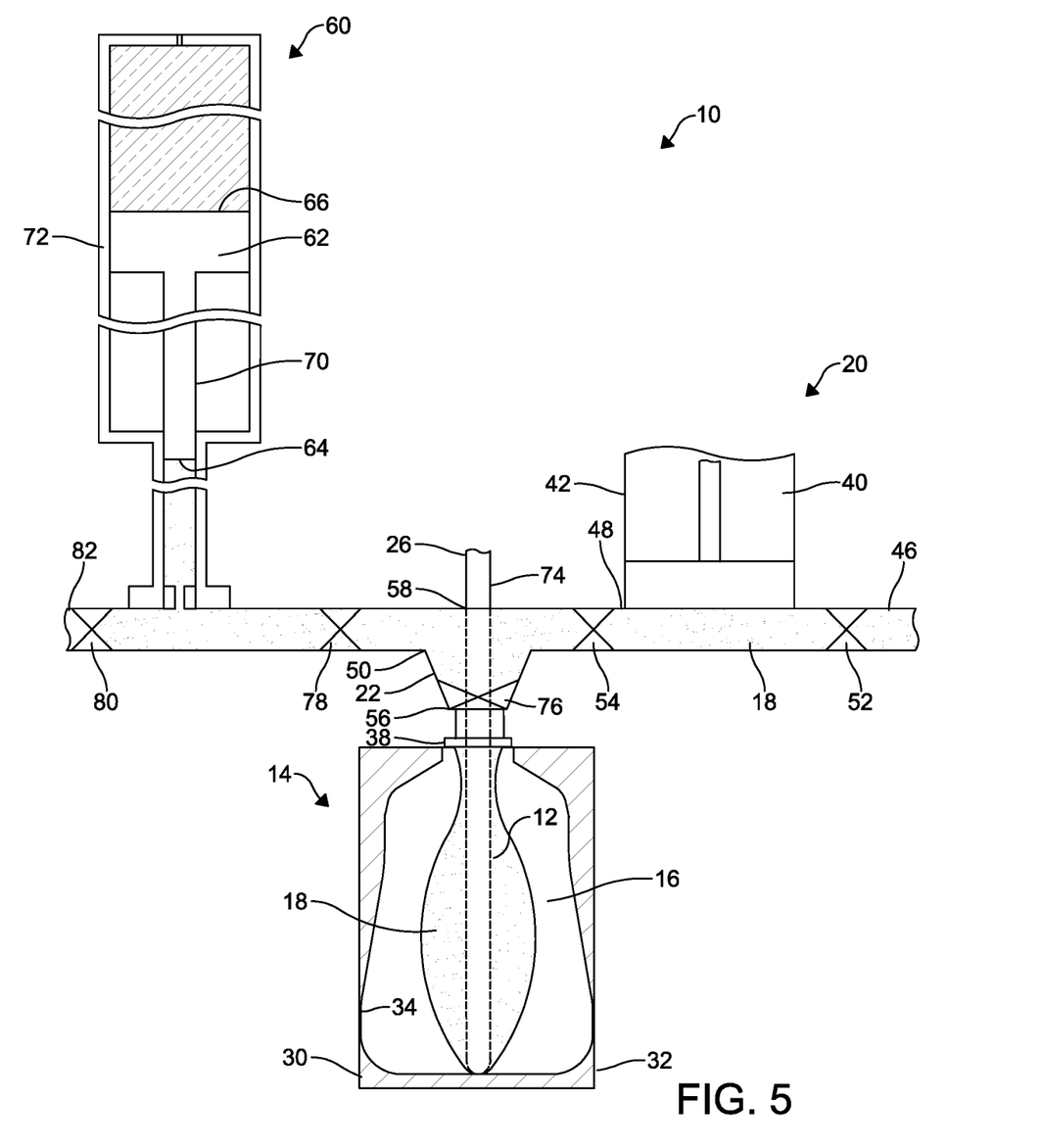
FIG. 5 is a schematic depiction of the system of FIG. 4, where downward movement of the piston-like device of the pressure source transfers the charge of first liquid to a hydraulic intensifier and a blow nozzle and where a portion of the first liquid is transferred from the blow nozzle into the stretched preform to partially expand the stretched preform to form a partially expanded preform.
Figure 6:
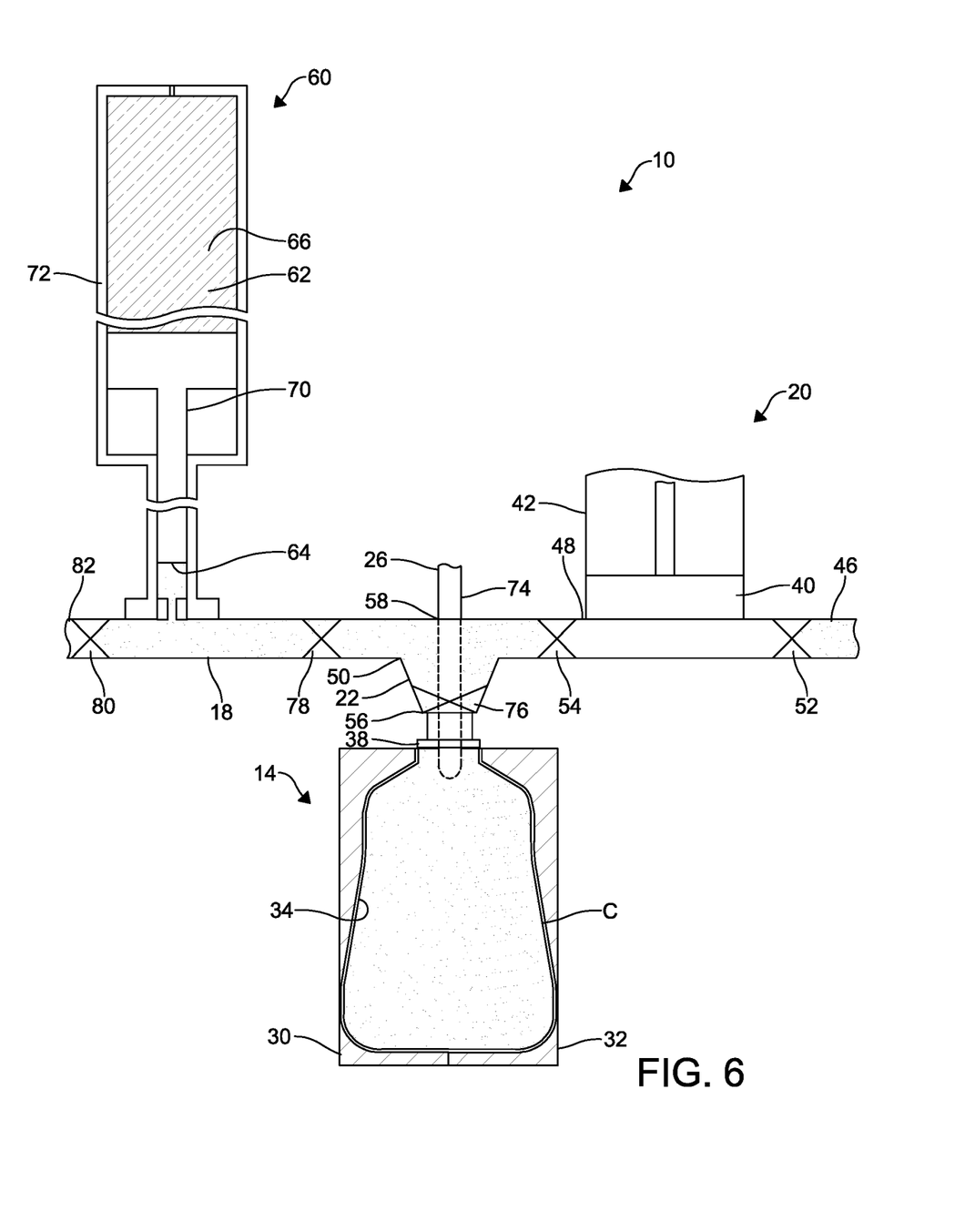
FIG. 6 is a schematic depiction of the system of FIG. 5, where a remainder of the charge of first liquid is being dispensed from the hydraulic intensifier at a high pressure to the blow nozzle and directed into the partially expanded preform to finish expansion and forming of the container within the mold.

With specific reference to FIG. 5, the piston-like device 40 of the pressure source 20 can then begin to drive downward to initiate transfer of the first liquid 18 from the filling cylinder, manifold, or chamber 42 to the hydraulic intensifier 60 and the hydraulic intensifier 60 and to the blow nozzle 22. Again, the piston-like device 40 can be actuated by any suitable means such as pneumatic, mechanical, electromagnetic, and/or hydraulic pressure. In various embodiments, the hydraulic pressure of the first liquid 18 being transferred to the hydraulic intensifier 60 and the blow nozzle 22 from the pressure source 20 can be between approximately 100 psi to 600 psi. Providing the first liquid 18 from the pressure source 20 to the hydraulic intensifier 60 and the blow nozzle 22 can occur with valves 54, 76, 78 in an open state. In this way, a portion of the first liquid 18 passes from the blow nozzle 22 through valve 76 into the stretched preform 12 to partially expand the stretched preform 12 toward the internal surface 34 of the mold cavity 16 to form a partially expanded preform 12. As the first liquid 18 causes the stretched preform 12 to partially expand toward the interior surface 34 of the mold cavity 16, residual air within the preform 12 can be vented through a passage 74 defined in the stretch rod 26. The pressure source 20 can be configured to provide the first liquid 18 to the hydraulic intensifier 60 and to the blow nozzle 22 at a third pressure, where the third pressure is less than the first pressure. Accordingly, the preform can be expanded by the first liquid 18 at the third pressure obtained from the pressure source 20 and can be expanded or further expanded by the first liquid 18 at the first pressure obtained from the hydraulic intensifier 60, as described herein.

As the first liquid 18 is also provided to the hydraulic intensifier 60 from the pressure source 20, the first pressure can be applied to the first liquid 18 using the hydraulic intensifier 60. Application of the first pressure to the first liquid 18 can occur with valve 54 in a closed state. The first surface 64 of the moveable member 62 can contact the first liquid 18. The second surface 66 of the moveable member 62 can be contacted by the second liquid 68, where the second liquid 68 provides the second pressure on the second surface 66. The second pressure on the second surface 66 of the moveable member 62 results in application of the first pressure by the first surface 64 to the first liquid 18. The hydraulic intensifier 60 thereby transfers and intensifies the lower second pressure into the higher first pressure, as the first surface 64 has a smaller area than the second surface 66. The first liquid 18 is then dispensed at the first pressure from the hydraulic intensifier 60 to the blow nozzle 22, where the blow nozzle 22 is configured to transfer and direct the first liquid 18 at the first pressure into the preform 12 within the mold cavity 16; see FIG. 6. Valves 78, 76 are in an open state and valve 54 is in a closed state for transfer of the first liquid at the first pressure into the preform 12. The first liquid 18 at the first pressure thereby further expands the partially expanded preform 12 toward the internal surface 34 of the mold cavity 16 using the first liquid 18 to form the resultant container C, where the first liquid 18 remains within the container C as an end product. As the first liquid 18 causes the partially expanded preform 12 to further expand toward the interior surface 34 of the mold cavity 16, any residual air within the preform 12 can be further vented through the passage 74 defined in the stretch rod 26.

Figure 7:
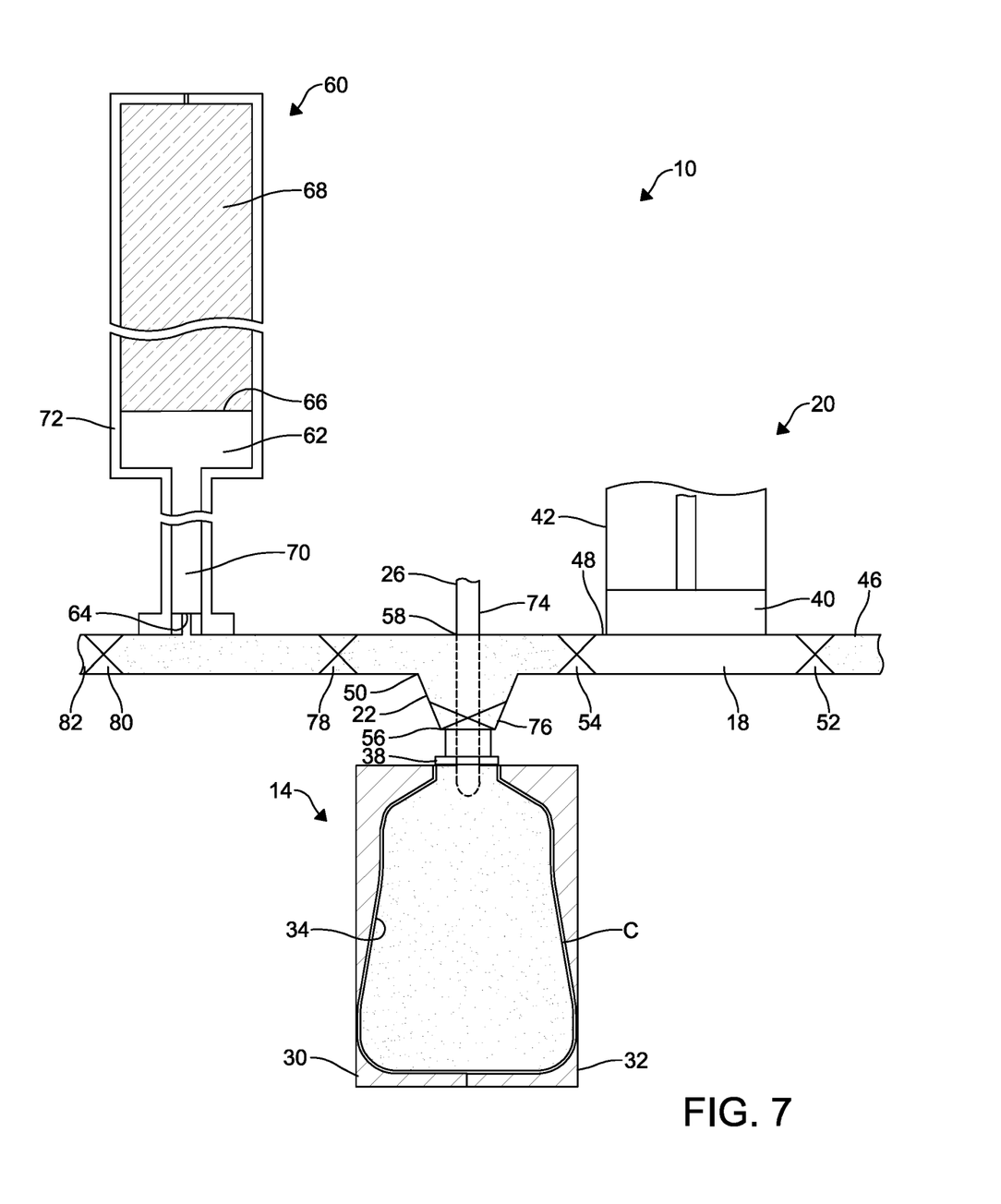
FIG. 7 is a schematic depiction of the system of FIG. 6, where the hydraulic intensifier has completed the transfer of the charge of first liquid to the newly formed container and where the stretch rod is being withdrawn therefrom.

As shown in FIG. 7, the hydraulic intensifier 60 has completed the dispensing of the charge of first liquid 18 at the first pressure, where transfer of the appropriate volume of the first liquid 18 to the newly formed plastic container C is complete. Concomitant with or thereafter, the stretch rod 26 can be withdrawn from the formed and filled container C within the mold cavity 16 while continuing to vent any residual air through passage 74. In certain embodiments, the stretch rod 26 can be designed to displace a predetermined volume of the first liquid 18 when it is withdrawn from the mold cavity 16 thereby allowing for a desired fill level of the first liquid 18 within the resultant plastic container C. Generally, the desired fill level can correspond to a level at or near the level of the support ring 38 of the plastic container C.

Figure 8:
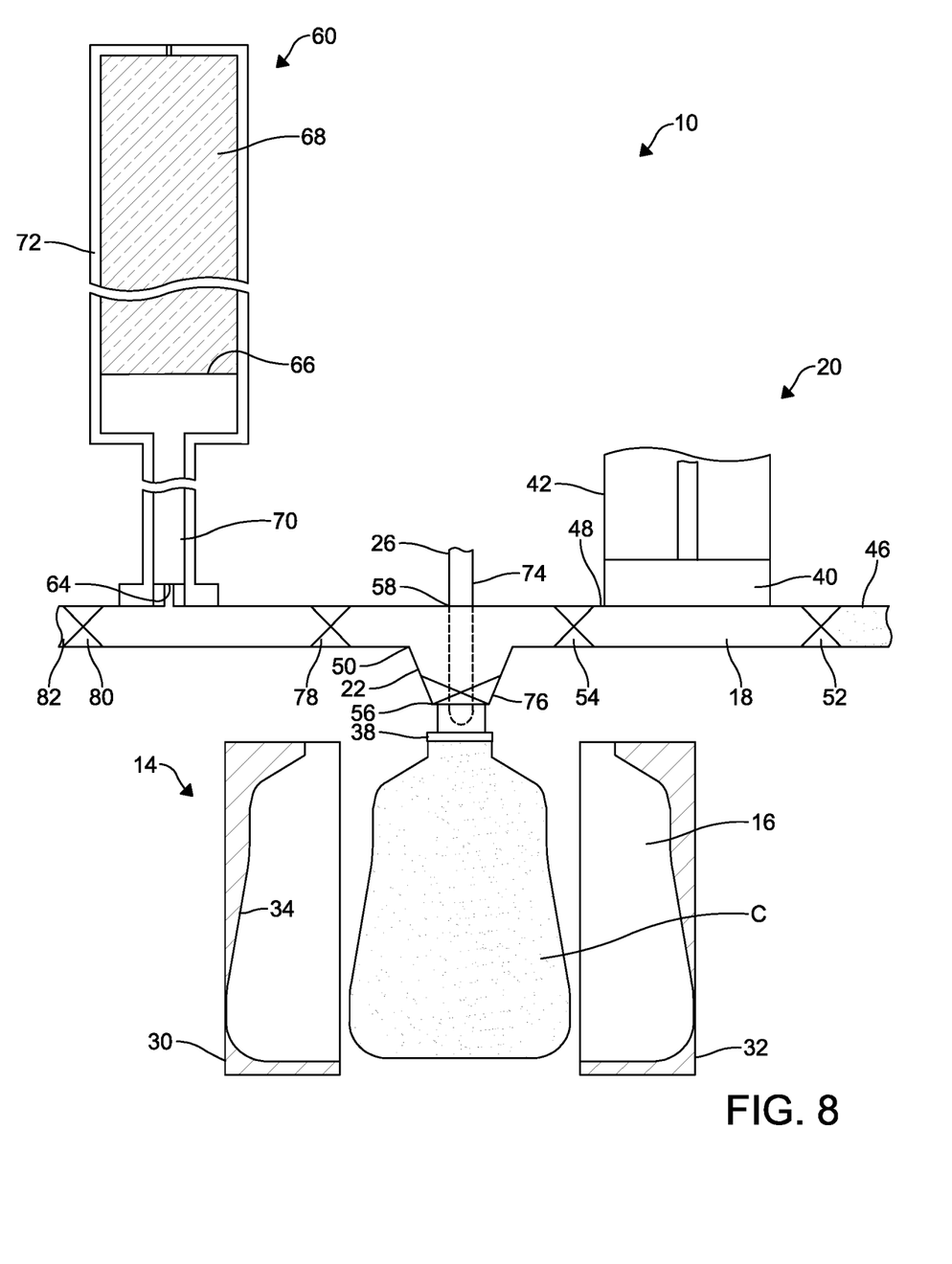
FIG. 8 is a schematic depiction of the system of FIG. 7, where the mold halves separate to release the resultant container filled with the charge of the first liquid.

With reference to FIG. 8, the fill cycle is shown completed. The mold halves 30, 32 can separate and the blow nozzle 22 can be withdrawn. The resultant filled plastic container C can now be subjected to various post-forming steps, such as capping, labeling, and packing. At this point, the piston-like device 40 of the pressure source 20 can begin the next cycle by drawing more of the first liquid 18 through the inlet 46 in preparation for the next fill/form cycle. While not specifically shown, it is appreciated that the system 10 can include a controller for communicating signals to one or more of the various components. In this way, the pressure source 20, the hydraulic intensifier 60, the mold 14, the blow nozzle 22, the stretch rod 26, and various valves can operate according to one or more signals communicated by the controller. It is also contemplated that the controller can be utilized to adjust various parameters associated with these components according to a given application.

The ability of the hydraulic intensifier 60 to generate pressures for sterilizing by Pascalization or high pressure processing further provides various ways to sterilize and clean portions of the system 10. For example, the first fluid 18 or another fluid can be in fluid communication with the hydraulic intensifier 60 and isolated by closure of valve 80 and closure of valves 78, 76, 54, and/or 52 to subject certain portions of the system to high pressure and sterilization. For example, closure of valves 80, 76, and 52 can sterilize the portions of the system 10 allowing fluid communication between the hydraulic intensifier 60, the blow nozzle 22, and the pressure source 20. Sub-portions can also be sterilized; e.g., where valves 80, 76, and 54 are closed to sterilize the portions of the system 10 allowing fluid communication between the hydraulic intensifier 60 and the blow nozzle 22. It should be noted that the hydraulic intensifier 60 can be fluidly coupled to other portions of the system 10 and other components incorporated into the system 10 where sterilization by high pressure processing is desired. As shown in the figures, valve 80 can control fluid communication with line 82 that is part of a recirculation or fluid recovery system (not shown). In this way, valve 80 can be opened to withdraw the first fluid 18 out of the system 10 at different stages for maintenance, for cleaning, and/or for recovery through line 82. Likewise, line 82 can be used to introduce another fluid into the system 10 when valve 80 is opened to clean or sterilize various portions of the system, including by use of the hydraulic intensifier 60.

The following benefits and advantages can be realized by the present technology. Pressures achieved by the hydraulic intensifier in forming and filling the container can sterilize the liquid used to form and fill the container and can result in improved transfer of mold details to the resulting filled container. Sterilization by Pascalization or high pressure processing provides a method of preserving and sterilizing food where the liquid used to form/fill the container is processed under very high pressure, which can lead to the inactivation of certain microorganisms and enzymes in the liquid. Such high pressure processing has a limited effect on covalent bonds within the liquid, thereby minimizing any changes in the liquid. During Pascalization, more than 50,000 pounds per square inch (340 MPa, 3.4 kbar) can be applied for a given time to the liquid, which can lead to the inactivation of any yeast, mold, and/or bacteria present in the liquid. Such high pressure sterilization processing is regarded as a "natural" liquid preservation method, as there is no use chemical preservatives.

The high forming/filling pressure can further result in improved transfer of mold details to the resultant filled container. Sharpness and distinctness of mold features can be improved and the size of mold features that can be effectively transferred can be reduced. The systems and processes provided by the present technology can accordingly impart fine details and textures to the resultant filled container. For example, indicia and/or text in sizes down to 4 pt. font can be effectively transferred. The height or distance of projections on the resultant container surface can also be increased as the high forming/filling pressure can force polymer of the preform into deeper mold recesses or features than previously obtainable.

The present technology serves to optimize the forming and filling of containers in various ways. As forming and filling are integrated closer, but remain two separate processes (such as conventional methods of blow molding then subsequently filling the blow molded container), the overall efficiency of such a system is the product of the individual efficiencies of the two parts. In particular, compressed air is an inefficient means of transferring energy. Using the final product to provide hydraulic pressure, as per the present technology, to form the container can employ the equivalent of a positive displacement pump. As a result, it is a more efficient way to transfer energy. Other efficiencies can be driven largely by the number of transitions as parts move through the various systems and machines. Integrating the container forming and filling processes into a simultaneous event can minimize the number of transitions of components (e.g., containers and liquid to be placed therein) and therefore increase the overall process efficiency. The process described herein can eliminate intermediary work-in-process and therefore can avoid the cost associated with warehousing and/or container silos and/or forklifts and/or product damage, sterile storage, sterilizing equipment, etc. In addition, without work-in-process inventory, the overall working capital can be reduced.

Other advantages of the present technology including lowering some of the processing parameters while still achieving desired results. For example, the requirements for preform conditioning can be reduced because the crystallinity requirements can be lowered. In addition, mold conditioning requirements can be reduced which can reduce the amount of oils and/or other surface preparation materials used on the interior surface of the mold cavity. The concurrent blowing and filling process described herein can also facilitate the formation of a super-lightweight container. As noted above, in traditional hot-fill containers, the container can require a suitable wall thickness to accommodate vacuum pressures. By sterilizing the preform prior to introducing the liquid and by using high pressure processing or Pascalization, the resultant wall thickness can be much thinner relative to a traditional hot-filled container. In a super-lightweight container, the liquid itself can give structural support to the container. The walls of a super-lightweight container can therefore be extremely flexible.

The combination of both the forming and filling processes into a integrated or unitary system can reduce handling parts and therefore lead to reduced capital cost per resultant plastic container C. In addition, the space required by a process that simultaneously forms and fills the resultant plastic container C can be significantly reduced over the space required when the processes are separate. This can also result in lower infrastructure cost. Integrating the two processes into a single step can reduce labor and additional costs (both capital and expense) associated with handling containers after they are produced and before they are filled. Integrating the blowing and filling processes into a single process eliminates the need to ship containers. The shipping of empty, formed containers is inherently inefficient and expensive. Shipping preforms, on the other hand, is much more efficient. As one example, a trailer load of empty 500 mL water bottles contains approximately 100,000 individual bottles. The same size trailer loaded with preforms required to make 500 mL water bottles can carry approximately 1,000,000 individual preforms, a 10:1 improvement.

In instances where products are hot filled, the package must be designed to accommodate the elevated temperature that it is exposed to during filling and the resultant internal vacuum it is exposed to as a result of the product cooling. A design that accommodates such conditions can require added container weight. Liquid/hydraulic blow molding offers the potential of eliminating the hot fill process and as a result, lowering the package weight.

The present technology further overcomes issues associated with liquid products that are susceptible to contamination. One predominant method for filling contaminant susceptible liquids is through hot filling, where the liquid is introduced to the container at a temperature that will pasteurize the liquid and can kill any microorganisms that are present. The resulting container can be sealed while the product is hot. However, one drawback to this technology is that the containers usually need to have a heavier weight design to sustain the elevated filling temperature and the vacuum that eventually develops in the container as the liquid product cools. The forming process can also be somewhat more complex and therefore more costly than non-heat set blow molding. The present technology offers the opportunity to reduce the cost and complexity of filling liquid products susceptible to contamination, including various liquid foods and beverages. By combining the forming and filling processes, there is an ability to heat the preform to over 212° F. (100° C.) for a sufficient period of time necessary to kill any biological contaminants. And the high pressure provided by the hydraulic intensifier can sterilize the liquid (by Pascalization or high pressure processing) substantially at the point the liquid is used to form the container, where the resultant container can be immediately sealed thereafter. The present technology can therefore provide an inexpensive and aseptic filling process with minimized opportunity for contamination.

The method described herein can be particularly useful for filling applications using liquids such as isotonic, juice, tea and other liquid commodities that are susceptible to biological contamination. In particular, by optionally sterilizing the preform as described herein, an aseptic preform and resulting container can be created without requiring the end liquid to be the sterilizing medium. These liquid commodities are typically filled in a controlled, sterile environment that can be established in various ways. One method for filling these types of liquids is by performing the process an aseptic filling environment; e.g., a clean room. All of the components of the product including the packaging are sterilized prior to filling. Once filled, the product can be sealed until it is consumed preventing any potential for the introduction of bacteria. The process is expensive to install and operate and there is always the risk of a bacterial contaminant breaking through the operational defenses and contaminating the product. This is one reason why the present technology, providing aseptic filling via Pascalization or high pressure processing with a hydraulic intensifier, realizes a significant advantage over having to maintain sterile fields and conditions; e.g., a clean room.

In other embodiments, the integrated blowing and filling processes described herein can be used to form containers including liquids such as carbonated beverages (i.e., soda, etc.). With respect to carbonated liquids, liquid carbon dioxide can be used in solution as part of, or in addition to, the liquid used for the simultaneous blowing and filling process. Liquid carbon dioxide prevents foaming that could otherwise occur when blowing with a liquid commodity having gaseous carbon dioxide. Carbon dioxide can exist in liquid form at a given pressure and temperature.

Many beverages, including juices, teas, beer, etc., are sensitive to oxygen and need to be protected when packaged. Many plastics do not have sufficient barrier characteristics to protect the contents from oxygen during the life of the packaged product. There are a number of techniques used to impart additional barrier properties to the container to slow down oxygen transmission and therefore protect the packaged contents. One of the most common techniques is to use an oxygen scavenger in the container wall. Such a scavenger can be molded directly into the preform. The relatively thick wall of the preform protects the scavenger from being consumed prior to blowing it into a container. However, once the container has been blown, the surface area of the wall increases and the thickness decreases. As such, the path that the oxygen has to travel to contact and react with the active scavenging material is shorter. Significant consumption of oxygen scavengers can begin as soon as the container is blown. If the container is formed and filled at the same time, then the scavenger is protecting the product through its entire useful life and not being consumed while the container sits empty waiting to be filled.

There are many other bottled products where this technology can be applicable. Consumable products such as dairy products, liquor, salad dressings, sauces, spreads, ketchups, syrups, edible oils, and others can be bottled utilizing such methods. Furthermore, the liquid used to form and fill a container can also include non-consumable liquid goods such as household cleaners, detergents, personal care items such as toothpaste, etc. Many of these products are currently found in blow molded PET containers but are also in extrusion molded plastic containers, glass bottles, and/or cans. The present technology can therefore optimize the economics of package manufacture and filling for such products.

While much of the description has focused on the production of PET containers, it is contemplated that other polyolefin materials (e.g., polyethylene, polypropylene, polyester, etc.) as well as a number of other plastics can be processed using the present technology.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A system for simultaneously forming and filling a container comprising:
    a mold cavity defining an internal surface and configured to accept a preform;
    a hydraulic intensifier configured to receive a first liquid and dispense the first liquid at a first pressure, the hydraulic intensifier including a moveable member having a first surface contacting the first liquid and a second surface contacting a second liquid, the second liquid configured to provide a second pressure on the second surface so that the first pressure is applied to the first liquid by the first surface, the first surface having a smaller area than the second surface, where the first pressure is greater than the second pressure, wherein the first pressure is greater than about 50,000 psi; and
    a blow nozzle configured to transfer the first liquid at the first pressure into the preform to urge the preform to expand toward the internal surface of the mold cavity and form a resultant container, where the first liquid remains within the container as an end product.

2. The system of claim 1, further comprising a pressure source configured to provide the first liquid to the hydraulic intensifier and to the blow nozzle.

3. The system of claim 2, wherein the pressure source is configured to provide the first liquid to the hydraulic intensifier and to the blow nozzle at a third pressure, the third pressure being less than the first pressure.

4. The system of claim 2, wherein the pressure source has an inlet, a chamber, an outlet, and a mechanically driven piston-like device moveable within the chamber in a first direction to draw a liquid into the chamber through the inlet and moveable in a second direction to urge the liquid out of the chamber through the outlet as the first liquid.

5. The system of claim 4, wherein the piston-like device is one of a piston, a pump, and an accumulator.

6. The system of claim 1, further comprising a stretch rod configured to mechanically stretch the preform within the mold cavity prior to the first liquid at the first pressure being transferred into the preform by the blow nozzle.

7. The system of claim 6, wherein the stretch rod is vented.

8. The system of claim 1, wherein the first pressure is no greater than 200,000 psi.

9. The system of claim 1, wherein the first pressure is from about 125,000 psi to about 175,000 psi.

10. A method of simultaneously forming and filling a container comprising:
    applying a first pressure to a first liquid using a hydraulic intensifier, the hydraulic intensifier including a moveable member having a first surface contacting the first liquid and a second surface contacting a second liquid, the second liquid configured to provide a second pressure on the second surface so that the first pressure is applied to the first liquid by the first surface, the first surface having a smaller area than the second surface, where the first pressure is greater than the second pressure, wherein the first pressure is greater than about 50,000 psi;
    dispensing the first liquid at the first pressure from the hydraulic intensifier to a blow nozzle, the blow nozzle transferring the first liquid at the first pressure into a preform within a mold cavity, the mold cavity defining an internal surface; and
    expanding the preform toward the internal surface of the mold cavity using the first liquid to form a resultant container, where the first liquid remains within the container as an end product.

11. The method of claim 10, wherein prior to applying the first pressure to the first liquid using the hydraulic intensifier, the method further comprises providing the first liquid to the hydraulic intensifier and to the blow nozzle using a pressure source.

12. The method of claim 11, wherein the pressure source provides the first liquid to the hydraulic intensifier and to the blow nozzle at a third pressure, the third pressure being less than the first pressure.

13. The method of claim 11, wherein providing the first liquid to the hydraulic intensifier and to the blow nozzle using the pressure source further includes the blow nozzle transferring a portion of the first liquid into the preform to partially expand the preform toward the internal surface of the mold cavity.

14. The method of claim 11, wherein the pressure source has an inlet, a chamber, an outlet, and a mechanically driven piston-like device moveable within the chamber in a first direction to draw a liquid into the chamber through the inlet and moveable in a second direction to urge the liquid out of the chamber through the outlet as the first liquid.

15. The method of claim 14, wherein the piston-like device is one of a piston, a pump, and an accumulator.

16. The method of claim 10, wherein prior to dispensing the first liquid at the first pressure from the hydraulic intensifier to the blow nozzle, the method further comprises using a stretch rod to mechanically stretch the preform within the mold cavity.

17. The method of claim 16, wherein expanding the preform toward the internal surface of the mold cavity using the first liquid to form a resultant container includes venting the preform through the stretch rod.

18. The method of claim 10, wherein the first pressure is no greater than 200,000 psi.

19. The method of claim 10, wherein the first pressure is from about 125,000 psi to about 175,000 psi.

20. A system for simultaneously forming and filling a container comprising:
   a mold cavity defining an internal surface and configured to accept a preform;
   a hydraulic intensifier configured to receive a first liquid and dispense the first liquid at a first pressure, the hydraulic intensifier including a moveable member having a first surface contacting the first liquid and a second surface contacting a second liquid, the second liquid configured to provide a second pressure on the second surface so that the first pressure is applied to the first liquid by the first surface, the first surface having a first area and the second surface having a second area, wherein the first area is smaller than the second area, wherein a ratio of the second area to the first area is greater than about 10:1, wherein the first pressure is greater than the second pressure; and
   a blow nozzle configured to transfer the first liquid at the first pressure into the preform to urge the preform to expand toward the internal surface of the mold cavity and form a resultant container, where the first liquid remains within the container as an end product.

21. The system of claim 20, wherein the ratio of the second area to the first area is from about 10:1 to about 20:1.

22. A method of simultaneously forming and filling a container comprising:
   applying a first pressure to a first liquid using a hydraulic intensifier, the hydraulic intensifier including a moveable member having a first surface contacting the first liquid and a second surface contacting a second liquid, the second liquid configured to provide a second pressure on the second surface so that the first pressure is applied to the first liquid by the first surface, the first surface having a first area and the second surface having a second area, wherein the first area is smaller than the second area, wherein a ratio of the second area to the first area is greater than about 10:1, wherein the first pressure is greater than the second pressure;
   dispensing the first liquid at the first pressure from the hydraulic intensifier to a blow nozzle, the blow nozzle transferring the first liquid at the first pressure into a preform within a mold cavity, the mold cavity defining an internal surface; and
   expanding the preform toward the internal surface of the mold cavity using the first liquid to form a resultant container, where the first liquid remains within the container as an end product.

23. The method of claim 22, wherein the ratio of the second area to the first area is from about 10:1 to about 20:1.

* * * * *